United States Patent
Wang

(10) Patent No.: US 11,241,973 B2
(45) Date of Patent: Feb. 8, 2022

(54) PILOT CONTROL CIRCUIT FOR CHARGING A VEHICLE WITH A CHARGING STATION

(71) Applicant: FORD GLOBAL TECHNOLOGIES, LLC, Dearborn, MI (US)

(72) Inventor: Chih-Lun Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 166 days.

(21) Appl. No.: 16/792,669

(22) Filed: Feb. 17, 2020

(65) Prior Publication Data

US 2021/0252990 A1     Aug. 19, 2021

(51) Int. Cl.

| | |
|---|---|
| *H02J 7/00* | (2006.01) |
| *B60L 53/62* | (2019.01) |
| *B60L 50/60* | (2019.01) |
| *B60L 1/00* | (2006.01) |
| *B60L 53/16* | (2019.01) |
| *B60L 58/15* | (2019.01) |
| *H02J 7/02* | (2016.01) |
| *H01M 10/42* | (2006.01) |
| *H01M 10/44* | (2006.01) |
| *H01M 10/46* | (2006.01) |
| *H02M 1/42* | (2007.01) |
| *H02M 3/335* | (2006.01) |

(52) U.S. Cl.
CPC ............... *B60L 53/62* (2019.02); *B60L 1/00* (2013.01); *B60L 50/60* (2019.02); *B60L 53/16* (2019.02); *B60L 58/15* (2019.02); *H01M 10/425* (2013.01); *H01M 10/44* (2013.01); *H01M 10/46* (2013.01); *H02J 7/02* (2013.01); *H01M 2010/4271* (2013.01); *H01M 2220/20* (2013.01); *H02J 2207/20* (2020.01); *H02M 1/4208* (2013.01); *H02M 3/33569* (2013.01)

(58) Field of Classification Search
USPC .................................. 320/107, 108, 109, 110
See application file for complete search history.

(56) References Cited

U.S. PATENT DOCUMENTS

| | | | |
|---|---|---|---|
| 8,698,346 B2 * | 4/2014 | Kamaga | B60L 50/61 |
| | | | 307/9.1 |
| 9,112,373 B2 | 8/2015 | Ghabbour et al. | |
| 9,895,986 B2 * | 2/2018 | Masuda | B60L 53/66 |

(Continued)

FOREIGN PATENT DOCUMENTS

| | | | | |
|---|---|---|---|---|
| JP | H0898324 A | 4/1996 | | |
| WO | WO-2011154815 A2 * | 12/2011 | ............. | B60L 53/14 |
| WO | WO-2014102955 A1 * | 7/2014 | .......... | H02J 7/00047 |

*Primary Examiner* — Brian Ngo
(74) *Attorney, Agent, or Firm* — David B Kelley; Brooks Kushman P.C.

(57) ABSTRACT

A vehicle includes a traction battery, an auxiliary battery, and a charge port configured to mate with a connector of a charging station. The charge port has a pilot pin. A control pilot circuit includes a first switch arranged between the pilot pin and a ground. The pilot circuit further includes a second switch arranged between the pilot pin and the ground. The second switch is configured to close in response to the voltage of the auxiliary battery being less than the threshold to induce the first voltage change in the pilot signal, and open in response to the voltage of the auxiliary battery exceeding the threshold.

20 Claims, 7 Drawing Sheets

(56) References Cited

U.S. PATENT DOCUMENTS

| | | | |
|---|---|---|---|
| 10,232,726 B2 | 3/2019 | Lee et al. | |
| 2011/0121779 A1* | 5/2011 | Ichikawa | B60L 50/61 |
| | | | 320/109 |
| 2011/0291612 A1* | 12/2011 | Fujitake | B60L 50/61 |
| | | | 320/107 |
| 2012/0098488 A1* | 4/2012 | Ichikawa | B60L 53/68 |
| | | | 320/109 |
| 2017/0182893 A1* | 6/2017 | Hayashizaki | B60L 53/14 |
| 2017/0334301 A1* | 11/2017 | Wu | B60L 53/18 |
| 2018/0312074 A1* | 11/2018 | Tsutsumi | H01M 10/48 |

* cited by examiner

PILOT CONTROL CIRCUIT FOR CHARGING A VEHICLE WITH A CHARGING STATION

TECHNICAL FIELD

This disclosure relates to electrified vehicles with capacity to be charged by an offboard charging station and more specifically to detecting connecting between the vehicle and the charging station.

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine.

SUMMARY

According to one embodiment, a vehicle includes a traction battery, an auxiliary battery, and a charge port configured to mate with a connector of a charging station. The charge port has a pilot pin. A control pilot circuit includes a first switch arranged between the pilot pin and a ground. A controller is powered by the auxiliary battery and is configured to, in response to (i) receiving a pilot signal generated by the charging station and (ii) a voltage of the auxiliary battery being greater than a threshold, close the first switch using power from the auxiliary battery to induce a first voltage change in the pilot signal. The pilot circuit further includes a second switch arranged between the pilot pin and the ground. The second switch is configured to close in response to the voltage of the auxiliary battery being less than the threshold to induce the first voltage change in the pilot signal, and open in response to the voltage of the auxiliary battery exceeding the threshold.

According to another embodiment, a control pilot circuit for controlling a charging process between a traction battery of a vehicle and a charging station. The control pilot circuit includes a pilot pin supported in a vehicle charge port and configured to receive a pilot signal from the charging station and a first switch arranged between the pilot pin and a ground. A controller is powered by an auxiliary battery of the vehicle and configured to, in response to (i) receiving the pilot signal and (ii) a voltage of the auxiliary battery being greater than a threshold, close the first switch using power from the auxiliary battery to induce a first voltage change in the pilot signal. The circuit further includes a second switch arranged between the pilot pin and the ground. The second switch is configured to close in response to the voltage of the auxiliary battery being less than the threshold to induce the first voltage change in the pilot signal, and open in response to the voltage of the auxiliary battery bus exceeding the threshold.

According to yet another embodiment, a method of charging an auxiliary battery with a vehicle charging station includes, in response to receiving a pilot signal from the charging station and a voltage of the auxiliary battery being less than a threshold, inducing a first voltage change in the pilot signal by connecting a pilot pin of a vehicle charge port to ground through a first switch that is configured to be closed when the voltage of the auxiliary battery is less than the threshold. The method further includes charging the auxiliary battery with power received from the vehicle charging station and, in response to the voltage of the auxiliary battery exceeding the threshold, closing a second switch operated by power from the auxiliary battery and opening the first switch, wherein closing the second switch also induces the first voltage drop in the pilot signal.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure may include various internal and external circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of discrete passive and active components such as resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof) and software which cooperate with one another to perform operation(s) disclosed herein. In addition, any one or more of the electric devices may be configured to execute a computer program that is embodied in a non-transitory computer readable storage medium that includes instructions to program a computer or controller to perform any number of the functions as disclosed.

Figure 1:
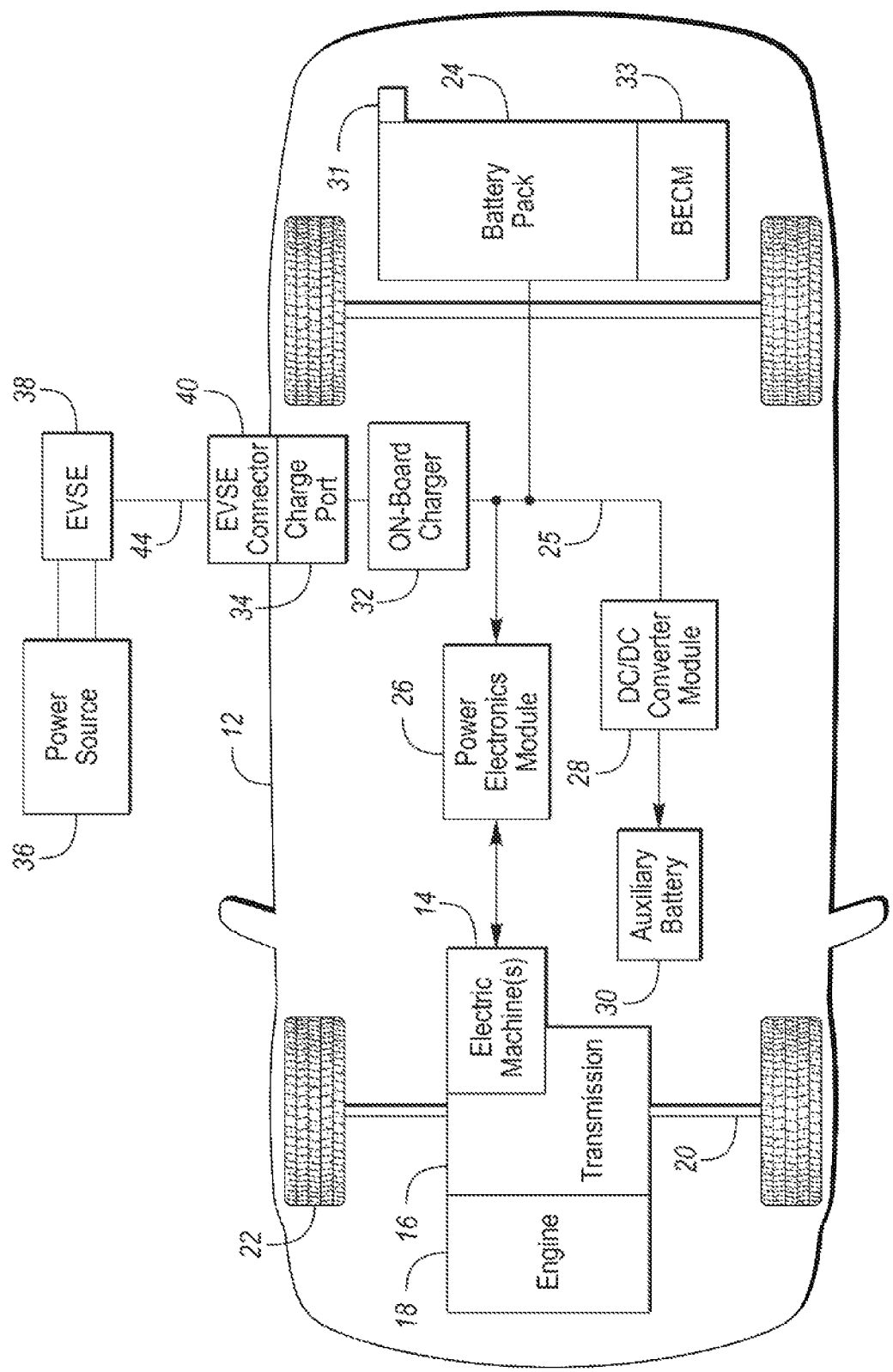
FIG. 1 is a schematic diagram of a plug-in hybrid vehicle.

FIG. 1 depicts a schematic of a plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and slowing capability when the engine 18 is turned ON or OFF. The electric machines 14 also act as generators and can provide fuel economy benefits by recovering energy through regenerative braking. The electric machines 14 reduce pollutant emissions and increase fuel economy by reducing the workload of the engine 18.

A traction battery or battery pack 24 stores energy that can be used by the electric machines 14. The traction battery 24 typically provides a high-voltage (HV) direct current (DC) output from one or more battery cell arrays, sometimes referred to as battery cell stacks, within the traction battery 24. The battery cell arrays may include one or more battery cells.

The battery cells, such as a prismatic, pouch, cylindrical, or any other type of cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal-management system. Examples of thermal-management systems include air cooling systems, liquid cooling systems, and a combination of air and liquid systems.

The traction battery 24 may be electrically connected to one or more power electronics modules 26 through one or more contactors. The one or more contactors isolate the traction battery 24 from other components when opened and connect the traction battery 24 to other components when closed. A power electronics module 26 is also electrically connected to the electric machines 14 and a high-voltage bus 25 and provides the ability to bi-directionally transfer energy between the traction battery 24 and the electric machines 14. For example, a typical traction battery 24 may provide a direct current (DC) voltage while the electric machines 14 may use a three-phase alternating current (AC) to function. The power electronics module 26 may convert the DC voltage to a three-phase AC current used by the electric machines 14. In a regenerative mode, the power electronics module 26 may convert the three-phase AC current from the electric machines 14 acting as generators to the DC voltage used by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high-voltage DC output of the traction battery 24 to a low-voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30 (e.g., a 12-volt battery). In other embodiments, the battery 30 may be 24 or 48 volts.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature sensor. The temperature sensor 31 may be in communication with the BECM 33 to provide temperature data regarding the traction battery 24.

The vehicle 12 may be recharged by a charging station, such as electric vehicle supply equipment (EVSE) 38, connected to an external power source 36. The external power source 36 may be an electrical power distribution network or grid as provided by an electric utility company. As shown, the external power source may be electrically coupled to the EVSE 38. Although the EVSE 50 is shown external to electric vehicle 10, it is also contemplated that EVSE 38 may be located within electric vehicle 12. The EVSE 38 capable of providing DC and/or AC electric power to the EVSE 38.

The EVSE 38 may receive and transfer the received electrical power through a cord 44 and connector 40 that plugs into a mating charge port 56 on the electric vehicle 12. As one example, the external power may be AC power received at the charge port 56 that is converted to DC power by an on-board charger 32 located within the electric vehicle 12. The on-board charger 32 may then operate to charge the traction battery 24. Alternatively, the on-board charger 32 may be located in the EVSE 38 external to the electric vehicle 10.

It is contemplated that the EVSE 38 may be realized in different mechanical configurations including a vehicle charger, a charging station, or a charger. It is also contemplated that the EVSE 38 may be installed as wall-mounted units in a garage, alongside a building where vehicles typically park, or in a stand-alone unit. The EVSE 38 may be a cord set which is sometimes referred to as a travel charger, portable charger, or handheld charger.

The connector 40 and charge port 34 may utilize a conductive connection in which the electrical conductors (pins) in one connector make physical contact with the electrical conductors (pins) in the other connector. However, it is also contemplated that a wireless power transfer (WPT) system may be employed where a transmitter may provide electric power to a receiver without the use of physical electrical conductors (e.g., power may be transferred through free space). It is contemplated that the power output into a wireless field (e.g., magnetic induction, electric induction, etc.) may be received, captured by, or coupled by a "receiving coil" to achieve the power transfer.

The various components discussed may have one or more controllers to control and monitor the operation of the components. The controllers may communicate via a serial bus (e.g., Controller Area Network (CAN)) or via dedicated electrical conduits. The controller generally includes any number of microprocessors, ASICs, ICs, memory (e.g., FLASH, ROM, RAM, EPROM and/or EEPROM) and software code to co-act with one another to perform a series of operations. The controller also includes predetermined data, or "look up tables" that are based on calculations and test data, and are stored within the memory. The controller may communicate with other vehicle systems and controllers over one or more wired or wireless vehicle connections using common bus protocols (e.g., CAN and LIN). Used herein, reference to "a controller" refers to one or more controllers. The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. Although not explicitly illustrated, those of ordinary skill in the art will recognize various functions or components that may be controlled by controller within each of the subsystems identified above. Representative examples of parameters, systems, and/or components that may be directly or indirectly actuated using control logic executed by the controller. Used herein, "high voltage" refers to a voltage exceeding 42 V AC or 60 V DC. "Low voltage" refers to voltages that are not high.

Figure 2:
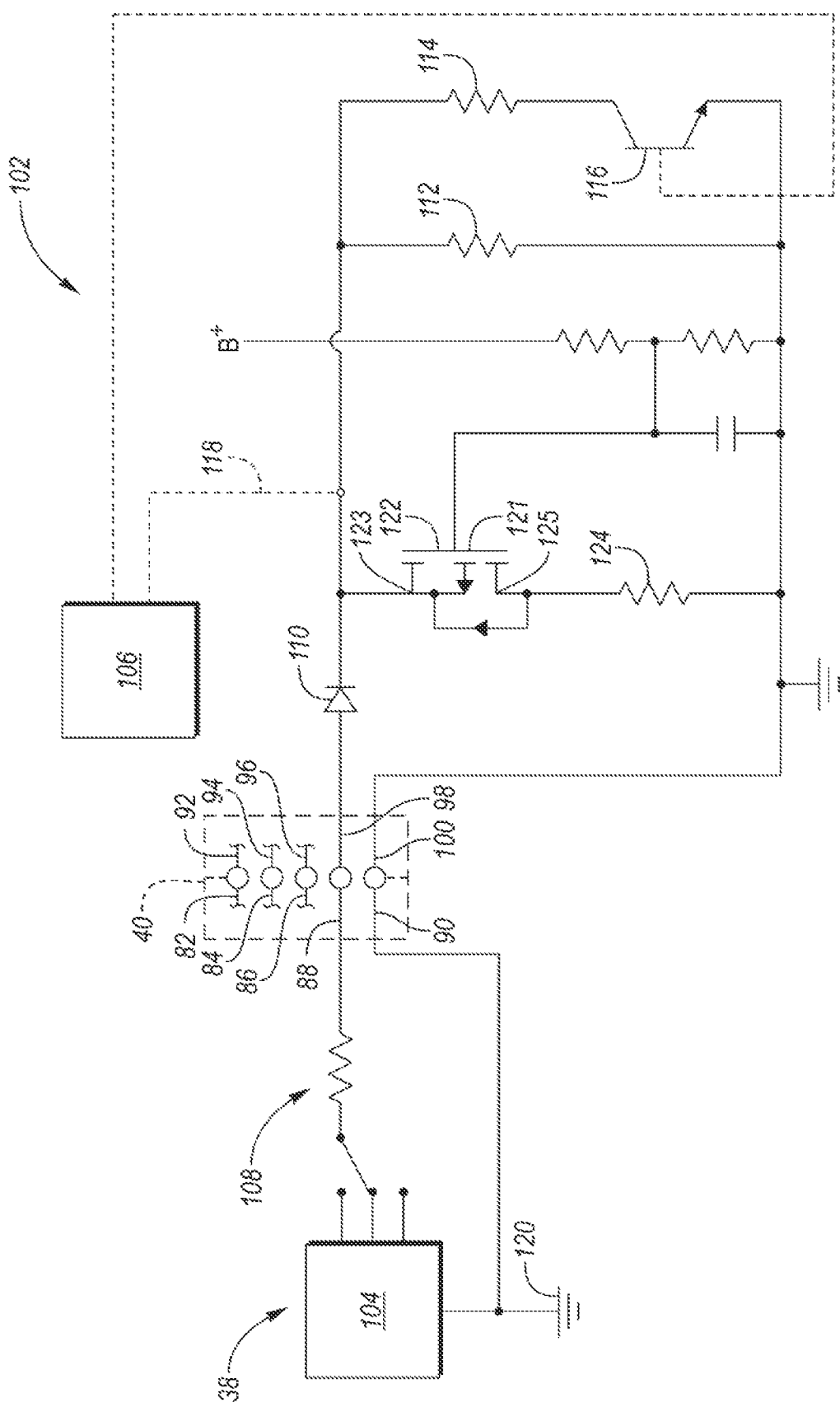
FIG. 2 is a diagram of a connection interface between a vehicle and a charging station.

Referring to FIG. 2, the EVSE connector 40 and the charge port 34 of the vehicle may be according to one or more standards such as SAE J1772. The connector 40 of the EVSE cord 44 may include five pins: two fly AC pins 82, 84, a proximity detection pin 86, a control pilot pin 88, and a ground pin 90. The pins may be male or female pins. The charge port 34 may include five matching pins: two HV AC pins 92, 94, a proximity detection pin 96, a control pilot pin 98, and a ground pin 100. The pins may be male or female pins. For example, the connector 40 may include female pins and the port 34 may include male pins. In some embodiments, the connector and the port may include two additional pins for DC charging. Of course, SAE J1772 is just one example configuration and others are contemplated.

A control pilot circuit 102 is used to control the charging process between the EVSE 38 and the on-board charger 32 among other functions. The control pilot circuit 102 includes an oscillator 104 configured to generate a plus-minus 12-volt pulse width modulation (PWM) signal (referred to as a pilot signal) at 1 kilohertz (kHz) duty cycle for example. During operation, the duty cycle may vary. This PWM signal is commutated to the vehicle charger 32 over the cord/port and is detected by a vehicle controller (such as the on-board battery charger controller) 106.

The pilot signal passes through a resistor 108, e.g., a 1.0 kiloohm (kΩ) resistor, prior to the vehicle 12. In the charger 32, the circuit 102 includes a diode 110 and a pair of parallel resistors 112 and 114. The resistor 112 may have a resistance of 2.74 kΩ and the resistor 114 may have a resistance of 1.3 kΩ. The resistor 112 may be hardwired to ground 120, whereas the resistor 114 is connected to ground 120 through a switch 116 that is actuated by the controller 106. The switch 116 may be a relay or solid-state switching device. The switch 116 may be biased open and commanded closed by the controller 106 in response to the controller 106 sensing the pilot signal as shown by trace 118. When the connector 40 is connected to the charge port 34, the pilot signal voltage at the connector 40 may be defined by the voltage divider formed by the resistances of resistors 108 and 112 relative to the ground 120. The resulting voltage may indicate to the vehicle controller 106 and the EVSE controller that the connector 40 is correctly connected to the charge port 34. Closing the switch 116 connects the resistor 114 to ground 120 induces a voltage change detected by the EVSE 38. The EVSE 38 is configured close its relay (sometimes called an EVSE contactor) in response to detecting the voltage change allowing power to flow from the EVSE 38 to the vehicle charge port 34. Further details of a pilot control circuit are described in Applicant's U.S. Pat. No. 10,046,661 (issued Aug. 14, 2018), the contents of which are incorporated in their entirety by reference herein.

The controller 106 is the internal charger controller, which can be powered by the internal housekeeping power supply either through the auxiliary battery 30 or through the HV bus across PFC capacitor 156. If the auxiliary battery 30 is insufficiently charged (i.e., the battery voltage is less than a threshold, such as 7 volts) the switch 116 will not close thus preventing charging by the EVSE 38. Hence HV bus across capacitor 156 will not be charged and controller 106 cannot be powered by the housekeeping power supply from either source. (Other functionality of the vehicle may also be impaired when the voltage of the battery 30 is low.) That is, a vehicle with a low auxiliary battery 30 cannot be charged with the EVSE 38, and instead, a user must first charge the auxiliary battery 30 before the EVSE 38 can be linked to the vehicle 12.

To overcome this and other problems, the pilot control circuit 102 includes an additional switch 122 that does not require power from the auxiliary battery 30. The switch 122 is biased closed when the auxiliary battery 30 is below the threshold and does not require the input from the controller 106 in order to create the necessary voltage change detected by the EVSE 38. The switch 122 may be a transistor-based switch such as a P-type metal-oxide-semiconductor (PMOS) as illustrated. The switch 122 may include a gate 121, a source 123, and a drain 125. The switch 122 is connected to ground 120 through a resistor 124. The resistor 124 may have the same resistance, e.g., 1.3 kΩ, as the resistor 114 so that closing the switch 122 is analogous to closing the switch 116. The switch 116 includes associated circuitry, such as resistors 126, 128 and is connected to the positive terminal (B+) of the battery 30. The switch 122 is operated based on voltage of the battery 30. When the voltage of the battery 30 is less than a threshold, e.g., 7 volts, the switch 122 is closed, and when the voltage is greater than the threshold, the switch 122 opens. The inclusion of the switch 122 and associated componentry allows the EVSE 38 and the vehicle 12 to establish communication and close the ESVE relay to provide power at the AC pins 92 and 94. Power, however, will not flow to the traction battery 24 unless the contactors are closed. The contactors are controlled by the BECM, which is also powered by the auxiliary battery 30. If the auxiliary battery 30 has insufficient voltage, e.g., less than 9 volts, the BECM is unable to close the contactors, and thus, the traction battery 24 cannot be charged until the auxiliary battery 30 is sufficiently charged to operate the controller. The vehicle 12 is configured to charge the auxiliary battery 30 using power from the EVSE 38 without requiring closing of the contactors.

Figure 3A:
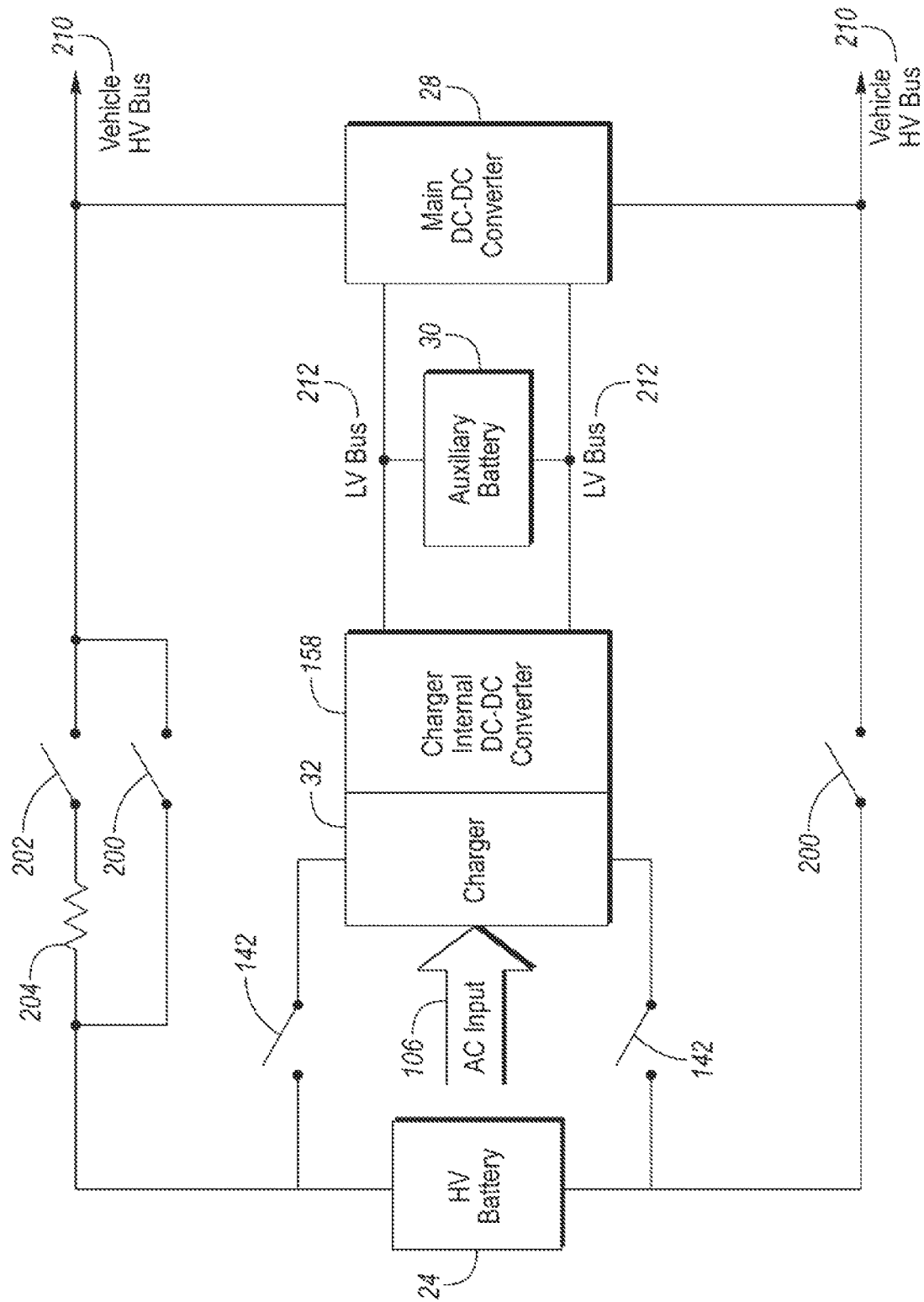
FIG. 3A is a diagram illustrating an example configuration of a vehicle high-voltage and low-voltage charging system according to one embodiment.

Referring to FIG. 3A, an example of a diagram of the vehicle charging system is shown. The on-board charger 32 receives an AC input voltage 106 from a source external to the vehicle, e.g., EVSE 38. The high-voltage traction battery 24 is coupled to the charger 32 through one or more charge contactors 142. The traction battery 24 is also coupled to a vehicle high-voltage bus 210 through one or more main contactors 200. The vehicle high-voltage bus 210 may include a power and return line in which the power line may be coupled to a positive terminal of the traction battery 24 and the return line may be coupled to a negative terminal of the traction battery 24. The traction battery 24 may also be coupled to the vehicle high-voltage bus 210 through a pre-charge contactor 202 and pre-charge resistor 204. The pre-charge contactor 202 may be closed prior to closing the main contactor 200 in order to limit current flow in the circuit. A main DC-DC converter 28 may be connected to the vehicle high-voltage bus 210. The main DC-DC converter 28 may convert high-voltage DC to a low-voltage DC compatible with the auxiliary battery 30. The auxiliary battery 30 and the low-voltage output of the main DC-DC converter 28 may connect to a low-voltage bus 212 that supplies 12-volt power to other modules in the vehicle. The low-voltage bus 212 may include a power and return line in which the power line may be coupled to a positive terminal of the auxiliary battery 30 and the return line may be coupled to a negative terminal of the auxiliary battery 30. Note that the system described is equally applicable when the low-voltage system 212 is other than 12V (e.g., 48V).

A controller may control the contactors (142, 200, and 202) to provide high-voltage power to various modules requiring high-voltage power. Under normal driving conditions, the main contactor 200 may be closed to provide power to the high-voltage bus 210. The main contactor 200 may be a relay-controlled contactor that closes to provide power to the high-voltage components (e.g., inverters, converters, heaters, etc.). Power inverters, heating modules and cooling modules may be connected to the high-voltage bus 210. The charger 32 may be connected to the high-voltage traction battery 24 via one or more charge contactors 142. During charging operations, the charging contactor 142 may be closed to allow power to be supplied from the charger 32 to the battery 24. AC voltage 106 is supplied to the charger 32 and converted to high-voltage DC by the charger 32. When the charge contactor 142 is closed, the voltage output of the charger 32 may be supplied to the high-voltage traction battery 24. The main contactor 200 and the charge contactor 142 may be activated at the same time if high-voltage components must operate while the EVSE connector 40 is attached.

As explained above, connecting the vehicle 12 to an off-board EVSE 38 requires low-voltage 12V electrical power to operate the vehicle systems. Modules drawing power from the low-voltage bus 212 of the vehicle may, over time, deplete the on-board auxiliary battery 30. Energizing the main high-voltage DC-DC converter 28 may provide support at the expense of enabling additional high-voltage and 12V loads and creating unnecessary energy losses.

Depending on the vehicle HV architecture, the main DCDC can directly support the LV bus 212 while vehicle AC charging, or a separate charger-internal low-voltage DC-DC converter 158 may be incorporated with the charger 32 module to support the vehicle low-voltage bus 212 directly from the AC input 106 when a charge connector is attached to the vehicle. The latter approach reduces the need for additional vehicle system activity and results in a highly optimized configuration. The smaller charger-internal DC-DC converter 208 may be appropriately sized and selected for highest efficiency at light charging system load conditions, e.g., 12V. The charger internal DC-DC converter 208 may convert high-voltage DC from the charger module 32 to low-voltage DC compatible with the auxiliary battery 30. An output of the charger internal DC-DC converter 158 may be connected to the low-voltage power bus 212 to provide low-voltage power to the system during charging.

During normal operation, the main DC-DC converter 28 is connected to the high-voltage bus 210 through the main contactor 200 and provides power to the auxiliary battery 30. However, during charging, there may be a need to close the main contactor 200. Closing the main contactor 200 provides high voltage to all the modules on the high-voltage bus 210. This may lead to additional power usage as components that are not necessary during charging may be required to be activated to manage the high voltage. In addition, during charging, the power requirements of the low-voltage bus 212 may be lower than during normal operation. The main DC-DC converter 28 may be optimized to provide power at a higher power output levels and may be less efficient at the lower power levels required during charging operations. The main contactor 200 may be closed during charging for features such as cabin pre-heating and pre-cooling.

The charger internal DC-DC converter 158 may be optimized to maximize power conversion efficiency at a lower power output level (e.g., 300 Watts) than the main DC-DC converter 28. During charging, the charger internal DC-DC converter 158 may be activated to provide power to the low-voltage bus 212. The advantage of this arrangement is that the main contactor 200 does not need to be closed during charging. In addition, the charger internal DC-DC converter 158 may be optimized to maximize power conversion efficiency for operating conditions and loads present during charging. For example, the converter 208 may be designed for operation during extended charging periods as opposed to operation during shorter drive cycles. Additionally, the second DC-DC converter 158 on the charging side may reduce the wear of the main contactors 200 as they need not necessarily be closed during charging.

The charger internal DC-DC converter 158 may be configured to have an adjustable voltage output in a range compatible with the auxiliary battery 30. The voltage output may be adjusted to provide an appropriate level of charging to the auxiliary battery 30. The voltage output may be adjusted to prevent gassing issues with the battery 30. The voltage output may be determined by another module and communicated to the charger internal DC-DC converter 158. The charger internal DC-DC converter 158 may be operated independently of charging the high-voltage battery 24. The charger internal DC-DC converter 158 may be configured to operate regardless of the status of the charge contactor 142. This provides an additional mode of operation in which the charger internal DC-DC converter 158 may operate to charge the battery 30 while AC voltage 106 is present to maintain the low-voltage bus 212 independent of charging of the high-voltage battery 24.

The operation of the charger internal DC-DC converter 158 is such that it may be operable before, during and after charging of the high-voltage battery 24. The system may delay the waking of other 12V modules for a predetermined period of time to allow the charger internal DC-DC converter 158 to stabilize the low-voltage bus 212 before loading begins. A signal to wake up other modules may be delayed until after the low-voltage stabilization period. For example, the charger 32 may wake up based on the control pilot signal. The charger 32 may provide an output that indicates when a signal may be sent to other modules for wake-up purposes.

The charger internal DC-DC converter 158 provides some advantages over a single main DC-DC converter 28. Connecting AC power 106 to the charger 32 does not require that the main contactor 200 be closed. This reduces wear on the main contactor 200 due to operation during charging. In addition, no additional power is drawn from modules connected to the high-voltage bus 210 which reduces the power required from the external power source. However, whether the LV bus 212 is supported by the charger internal DC-DC 158 to optimize LV charge efficiency or by the main DC-DC 28 to save the additional HW in the charger, it all requires the auxiliary battery 30 to be sufficiently charged to be able to activate the HV system and initialize the charging sequence.

Figure 3B:
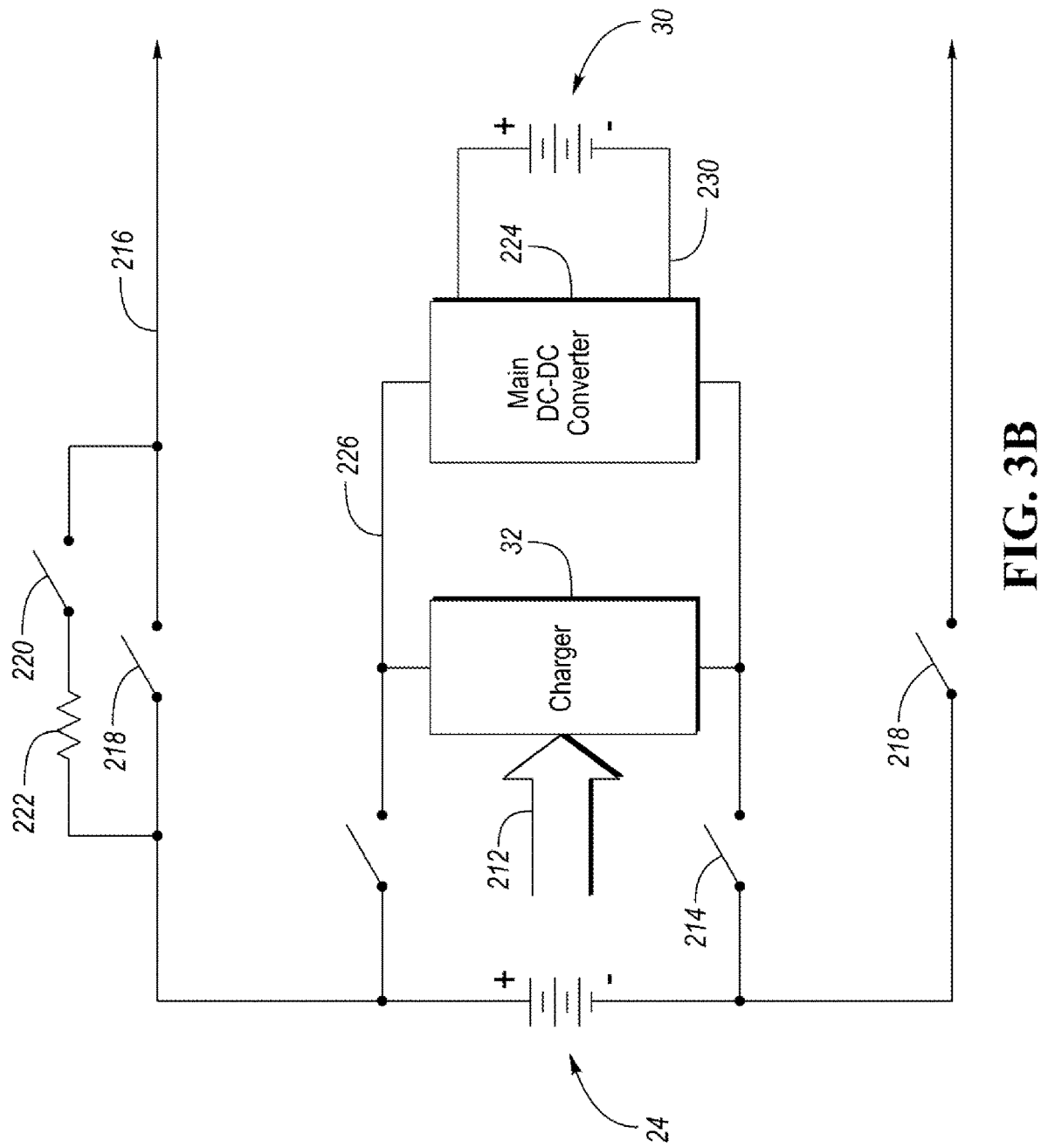
FIG. 3B is a diagram illustrating an example configuration of a vehicle high-voltage and low-voltage charging system according to another embodiment.

FIG. 3B illustrate an alternative circuitry for the vehicle charging system. In this embodiment, the on-board charger 32 receives an AC input voltage 212 from a source external to the vehicle, e.g., EVSE 38. The high-voltage traction battery 24 is coupled to the charger 32 through one or more charge contactors 214. The traction battery 24 is also coupled to a vehicle high-voltage bus 216 through one or more main contactors 218. The vehicle high-voltage bus 216 may include a power and return line in which the power line may be coupled to a positive terminal of the traction battery 24 and the return line may be coupled to a negative terminal of the traction battery 24. The traction battery 24 may also be coupled to the vehicle high-voltage bus 216 through a pre-charge contactor 220 and pre-charge resistor 222. A main DC-DC converter 224 may be connected to the charger bus 226. The main DC-DC converter 224 may convert high-voltage DC to a low-voltage DC compatible with the auxiliary battery 30. The auxiliary battery 30 and the low-voltage output of the main DC-DC converter 28 may connect to a low-voltage bus 230 that supplies 12-volt power to other modules in the vehicle. The low-voltage bus 230 may include a power and return line in which the power line may be coupled to a positive terminal of the auxiliary battery 30 and the return line may be coupled to a negative terminal of the auxiliary battery 30. Note that the system described is equally applicable when the low-voltage system 230 is other than 12V (e.g., 48V).

Figure 4:
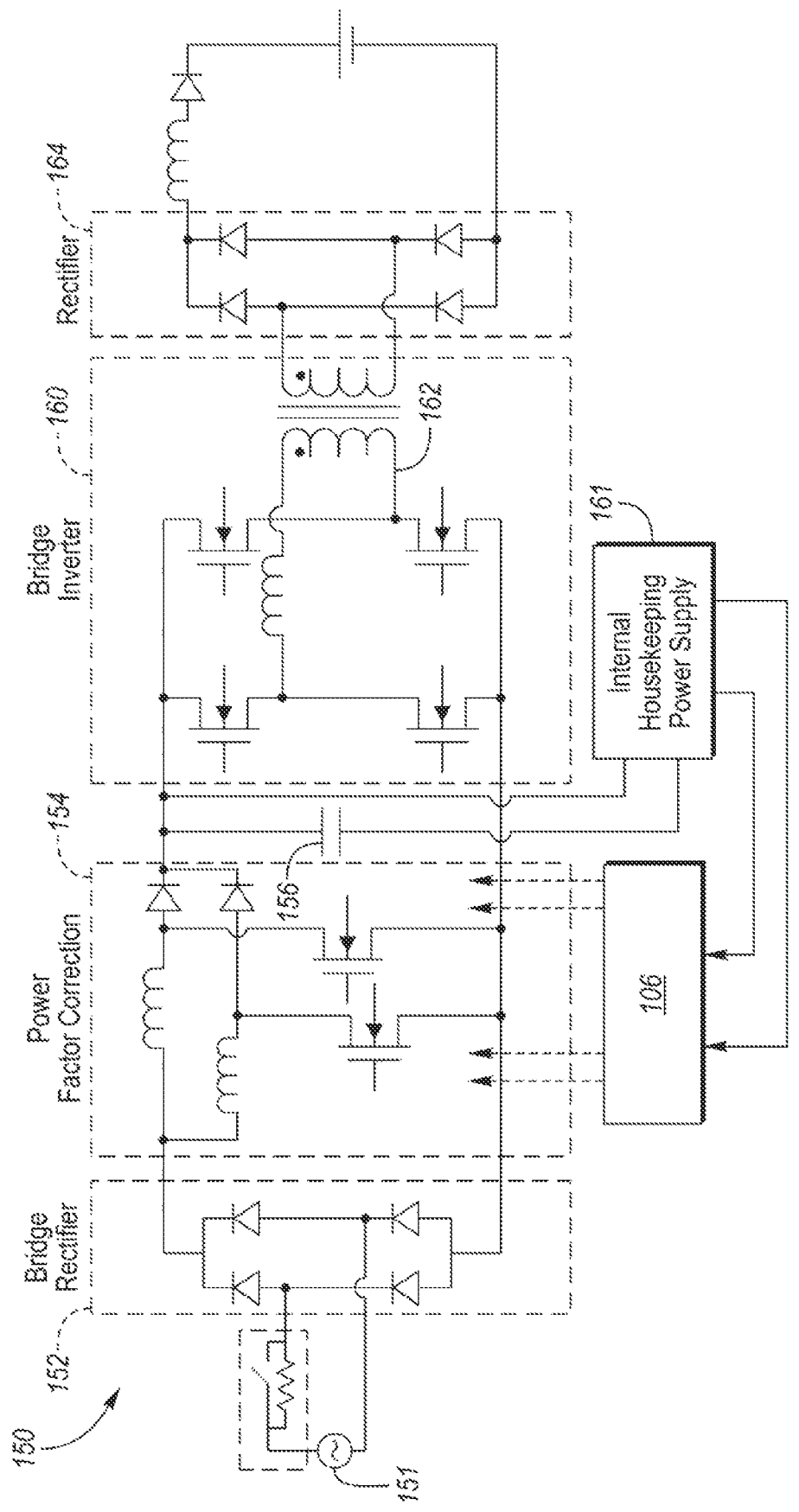
FIG. 4 is a diagram showing power circuitry of an on-board charger.

Referring to FIG. 4, the on-board charger 32 includes power circuitry 150 having a bridge rectifier 152 configured to convert AC power 151 received from the EVSE 38 the into DC power. A power factor correction 154 conditions the power prior to a bridge inverter 160. A bulk capacitor 156 receives power from the power factor correction 154. As soon as the on-board charger 34 receives AC power from the EVSE 38, the capacitor 156 is pre-charged to the peak voltage of the AC input. An internal housekeeping power supply 161 is connected to the capacitor 156. The internal housekeeping power supply 161 includes a multi winding, low power isolated HV-LV and LV-LV DC/DC converter configured to convert power supplied by the capacitor 156 or auxiliary battery 30 into multiple low-voltages usable by the one or more controllers, e.g., controller 106, of the charger. The circuitry 150 also includes a bridge inverter 160 that converts DC power to AC power. A transformer 162 provides isolation between the AC side and the DC side of the HV battery 24. A rectifier 164 converts AC from the transformer 162 to DC power compatible with the high-voltage battery 124.

Figure 5:
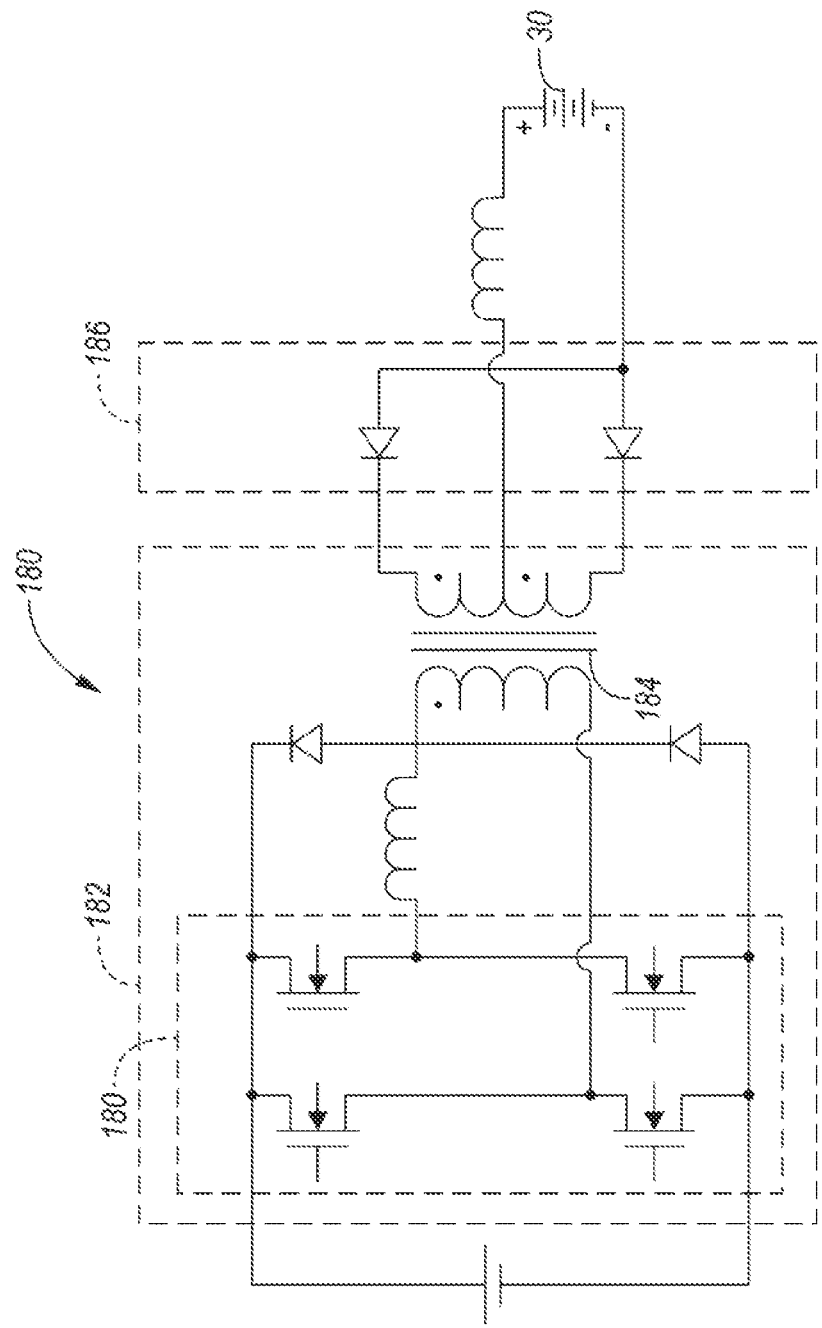
FIG. 5 is a diagram showing power circuitry of a high-voltage to low-voltage DC/DC converter.

Referring to FIG. 5, the auxiliary battery 30 can receive power from a high-voltage DC source, e.g., the battery 24 or the DC HV bus, through power circuitry 180 of the DC/DC converter 28. The circuitry 180 includes an inverter 182 that converts DC power from the source to AC power. A transformer 184 modifies the current received from the inverter 182. A rectifier 186 converts the AC power received from the transformer 184 into low-voltage DC power compatible with the auxiliary battery 30.

Figure 6:
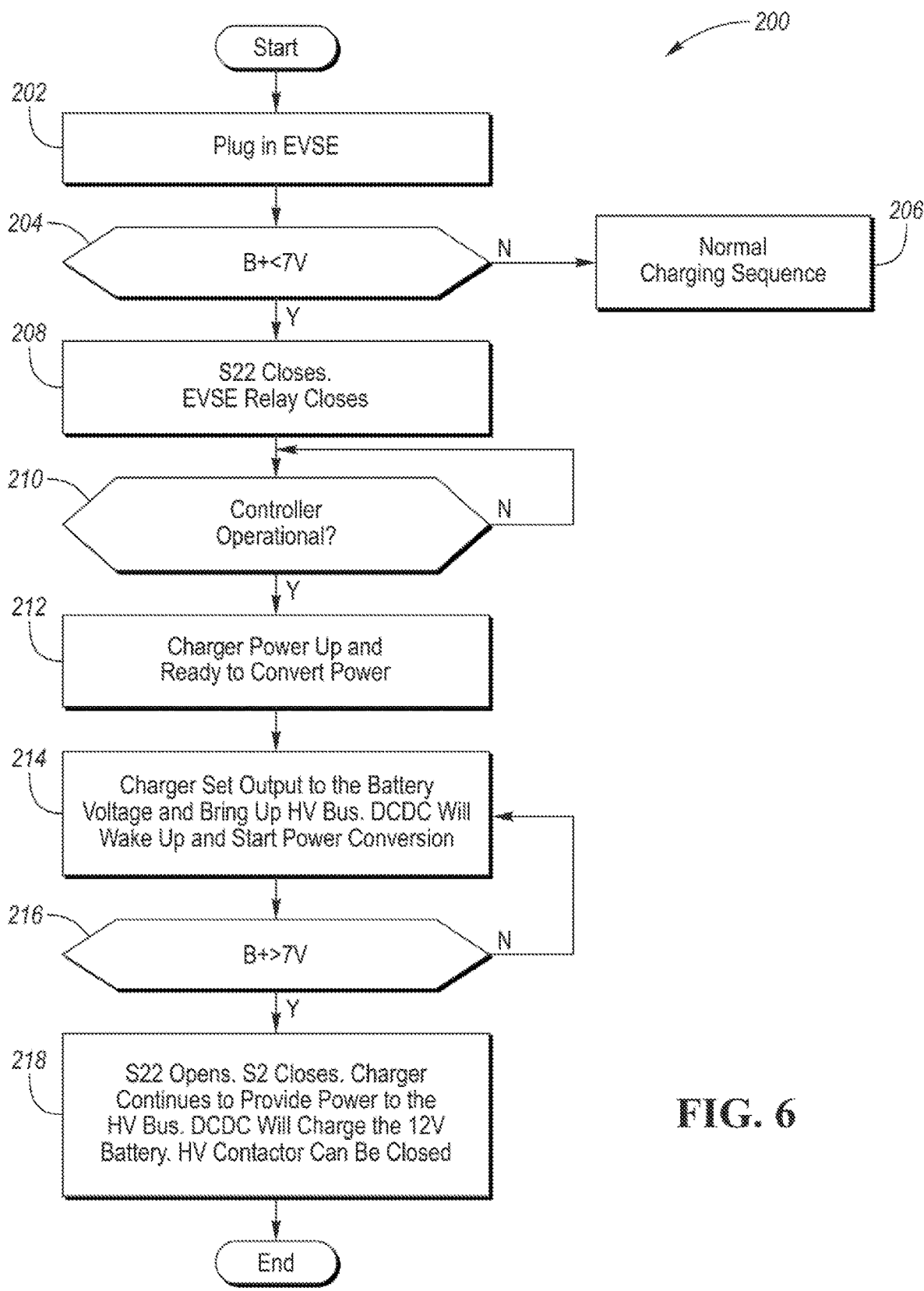
FIG. 6 is a flow chart of a method for charging an auxiliary battery of a vehicle with a charging station.

FIG. 6 illustrates a method of charging an auxiliary battery with an EVSE. One or more steps of the method may be executed by one or more controllers of the vehicle. This figure provides representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle controller. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The method 200 begins at step 202 when the cord of the EVSE is plugged into the charge vehicle port. A pilot control circuit can communicate a valid connection, among other things, by having one of switches 116 or 122 closed. As explained above, switch 122 is used when the auxiliary battery 30 at a low state of charge and switch 116 is used under normal operating conditions. If the auxiliary battery voltage exceeds the threshold, the switch 122 will automatically open resulting in the control pilot circuit operating normally at step 206. Under normal operation, switches 116 and 122 are open prior to the EVSE being connected to the vehicle. Once the EVSE is connected, the vehicle receives the pilot signal which is sensed by the controller 106. The controller 106 then commands the switch 116 closed communicating a voltage change to the EVSE. In response, the EVSE closes its relay providing power to the vehicle charge port. Using this power, the high-voltage bus is pre-charged and once complete, the contactors are closed allowing power to flow from the EVSE to the traction battery.

If yes at step 204, the switch 122 will automatically be closed due to its bias. Closing the switch 122 is analogous to closing the switch 116, therefore, the vehicle will establish communication EVSE and power will be available to the charge port. The internal housekeeping power supply receives power from the EVSE allowing the controller to boot-up at step 208. The method loops at step 210 until the controller is operational. Once the controller boots up, the onboard charger powers up and is ready to convert power at step 212. At step 214, the charger sets the output to the HV battery voltage and brings up the high-voltage bus. The DC/DC circuit will wake up and start charging the auxiliary battery 30 through LV bus 212. As soon as the DC/DC converter 28 or 158 starts converting power, the LV bus 212 will exceed the threshold, and now the control passes to step

218. At step 218, the switch 122 opens due to the voltage exceeding the threshold, and at the same time the controller commands the switch 116 closed therefore there's no pilot signal change that will interrupt AC power from the EVSE. After switch 116 is closed and the LV bus 212 is ok supported by the DC/DC converter through the AC source, the normal HV charging sequence can be established and the BECM controller will command the high-voltage contactors closed so that the traction battery can be charged by the charger through EVSE. The auxiliary battery 30 will continue to be charged until a desired state of charge is achieved.

The above-described hardware and controls allows a vehicle with a low or dead auxiliary battery to be connected with an EVSE to charge both the auxiliary battery and the traction battery. This eliminates the need to first charge the auxiliary battery using a separate charger prior to providing power from the EVSE to the vehicle. The above-described vehicle streamlines the process for a user enabling them to simply plug in the EVSE and allow the vehicle to do the rest.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a traction battery;
   an auxiliary battery;
   a charge port configured to mate with a connector of a charging station, the charge port including a pilot pin; and
   a control pilot circuit including:
      a first switch arranged between the pilot pin and a ground,
      a controller powered by the auxiliary battery and configured to, in response to (i) receiving a pilot signal generated by the charging station and (ii) a voltage of the auxiliary battery being greater than a threshold, close the first switch using power from the auxiliary battery to induce a first voltage change in the pilot signal, and
      a second switch arranged between the pilot pin and the ground, the second switch being configured to
         close in response to the voltage of the auxiliary battery being less than the threshold to induce the first voltage change in the pilot signal, and
         open in response to the voltage of the auxiliary battery exceeding the threshold.

2. The vehicle of claim 1, wherein the control pilot circuit further includes a first resistor associated with the first switch and a second resistor associated with the second switch, wherein the first switch is configured to connect the first resistor to the ground when closed, and the second switch is configured to connect the second resistor to the ground when closed.

3. The vehicle of claim 1, wherein the first and second resistors have a same resistance.

4. The vehicle of claim 3 wherein the resistance is 1.3 kiloohms.

5. The vehicle of claim 1, wherein the second switch is a transistor.

6. The vehicle of claim 5, wherein the second switch is a P-type metal-oxide-semiconductor (PMOS) transistor.

7. The vehicle of claim 1, wherein the control pilot circuit further includes a resistor connected between the pilot pin and ground.

8. The vehicle of claim 1 further comprising:
   a high-voltage battery charging circuit connecting at least one power pin of the charge port to the traction battery.

9. The vehicle of claim 8, wherein the high-voltage battery charging circuit includes at least one contactor that electrically connects the least one power pin to the traction battery when closed.

10. The vehicle of claim 9, wherein the controller is further configured to command the contactor closed based on the pilot signal.

11. The vehicle of claim 1, wherein the pilot signal is a pulse width modulation signal.

12. A control pilot circuit for controlling a charging process between a traction battery of a vehicle and a charging station, the control pilot circuit comprising:
    a pilot pin supported in a vehicle charge port and configured to receive a pilot signal from the charging station;
    a first switch arranged between the pilot pin and a ground;
    a controller powered by an auxiliary battery of the vehicle and configured to, in response to (i) receiving the pilot signal and (ii) a voltage of the auxiliary battery being greater than a threshold, close the first switch using power from the auxiliary battery to induce a first voltage change in the pilot signal, and
    a second switch arranged between the pilot pin and the ground, the second switch being configured to
       close in response to the voltage of the auxiliary battery being less than the threshold to induce the first voltage change in the pilot signal, and
       open in response to the voltage of the auxiliary battery exceeding the threshold.

13. The vehicle of claim 12, wherein the control pilot circuit further includes a first resistor associated with the first switch and a second resistor associated with the second switch, wherein the first switch is configured to connect the first resistor to the ground when closed, and the second switch is configured to connect the second resistor to the ground when closed.

14. The vehicle of claim 12, wherein the first and second resistors have a same resistance.

15. The vehicle of claim 12, wherein the second switch is a transistor.

16. The vehicle of claim 15, wherein the second switch is a P-type metal-oxide-semiconductor (PMOS) transistor.

17. The vehicle of claim 12, wherein the control pilot circuit further includes a resistor connected between the pilot pin and ground.

18. The vehicle of claim 12, wherein the pilot signal is a pulse width modulation signal.

19. A method of charging an auxiliary battery with a vehicle charging station, the method comprising:
- in response to receiving a pilot signal from the charging station and a voltage of the auxiliary battery being less than a threshold, inducing a first voltage change in the pilot signal by connecting a pilot pin of a vehicle charge port to ground through a first switch that is configured to be closed when the voltage of the auxiliary battery is less than the threshold;
- charging the auxiliary battery with power received from the vehicle charging station; and
- in response to the voltage of the auxiliary battery exceeding the threshold, closing a second switch operated by power from the auxiliary battery and opening the first switch, wherein closing the second switch also induces the first voltage drop in the pilot signal.

20. The method of claim 19, wherein the first switch is a P-type metal-oxide-semiconductor (PMOS) transistor.

* * * * *